UNITED STATES PATENT OFFICE.

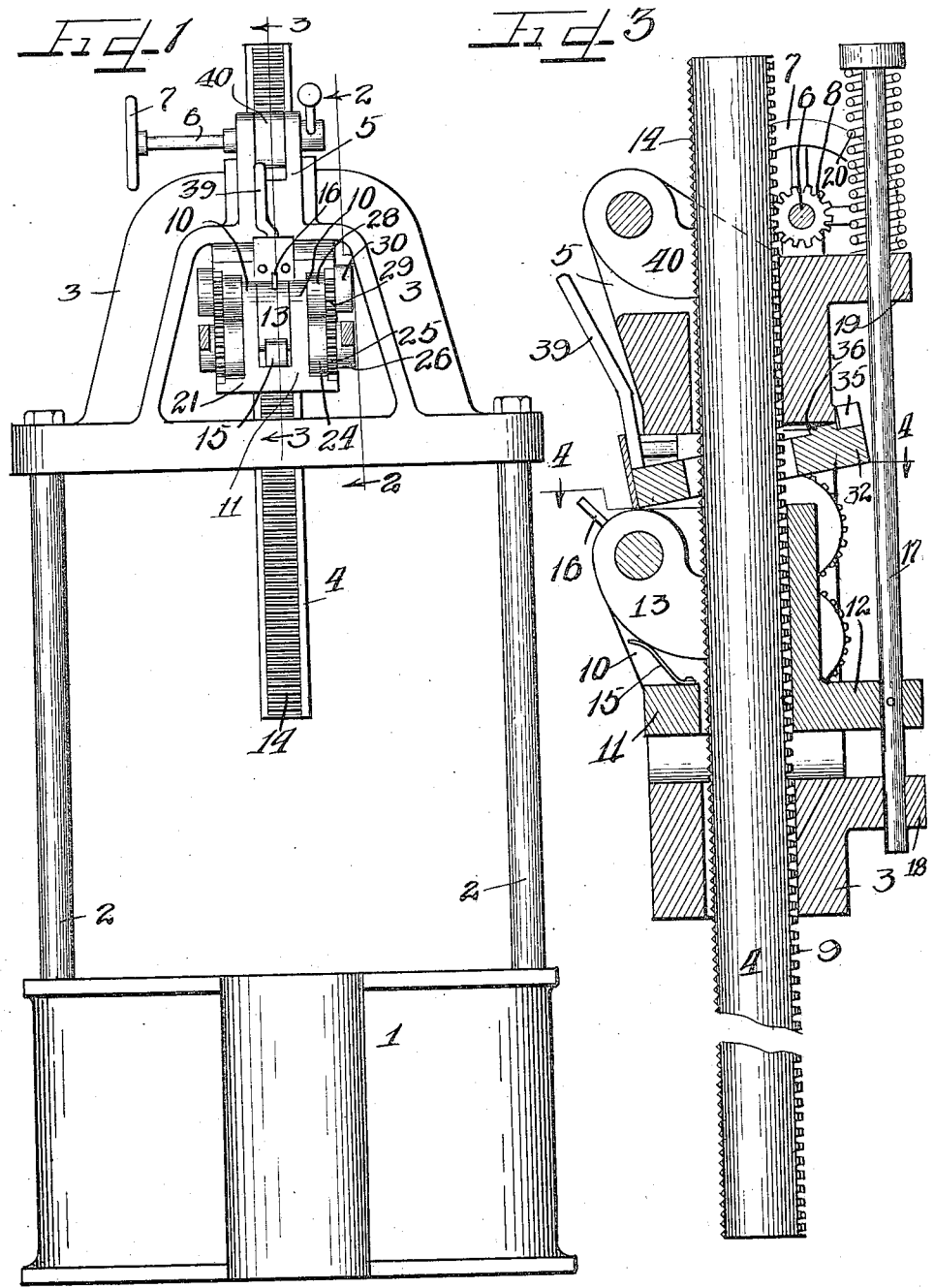

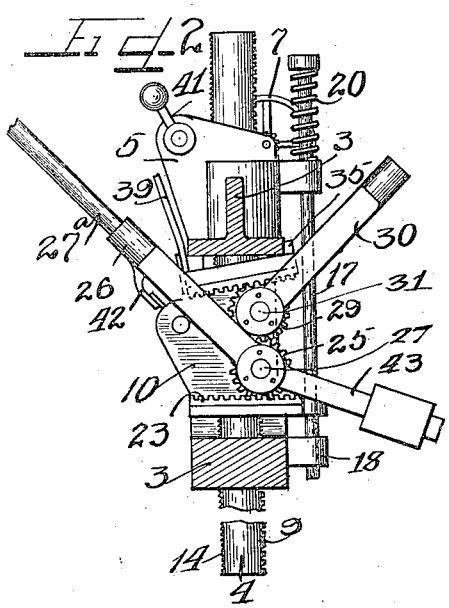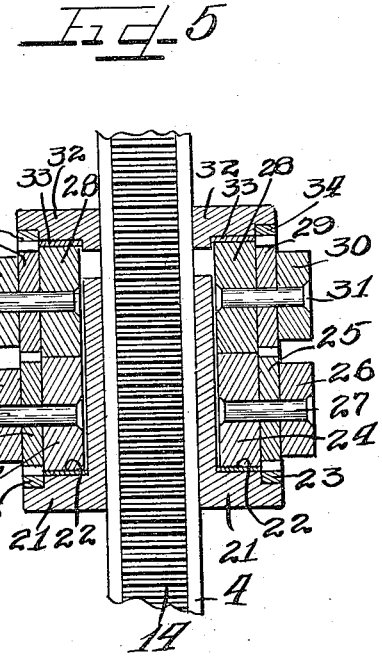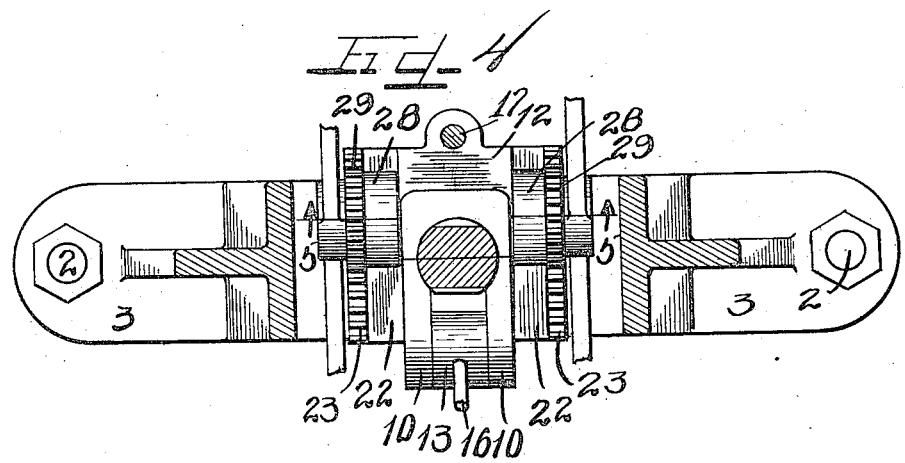

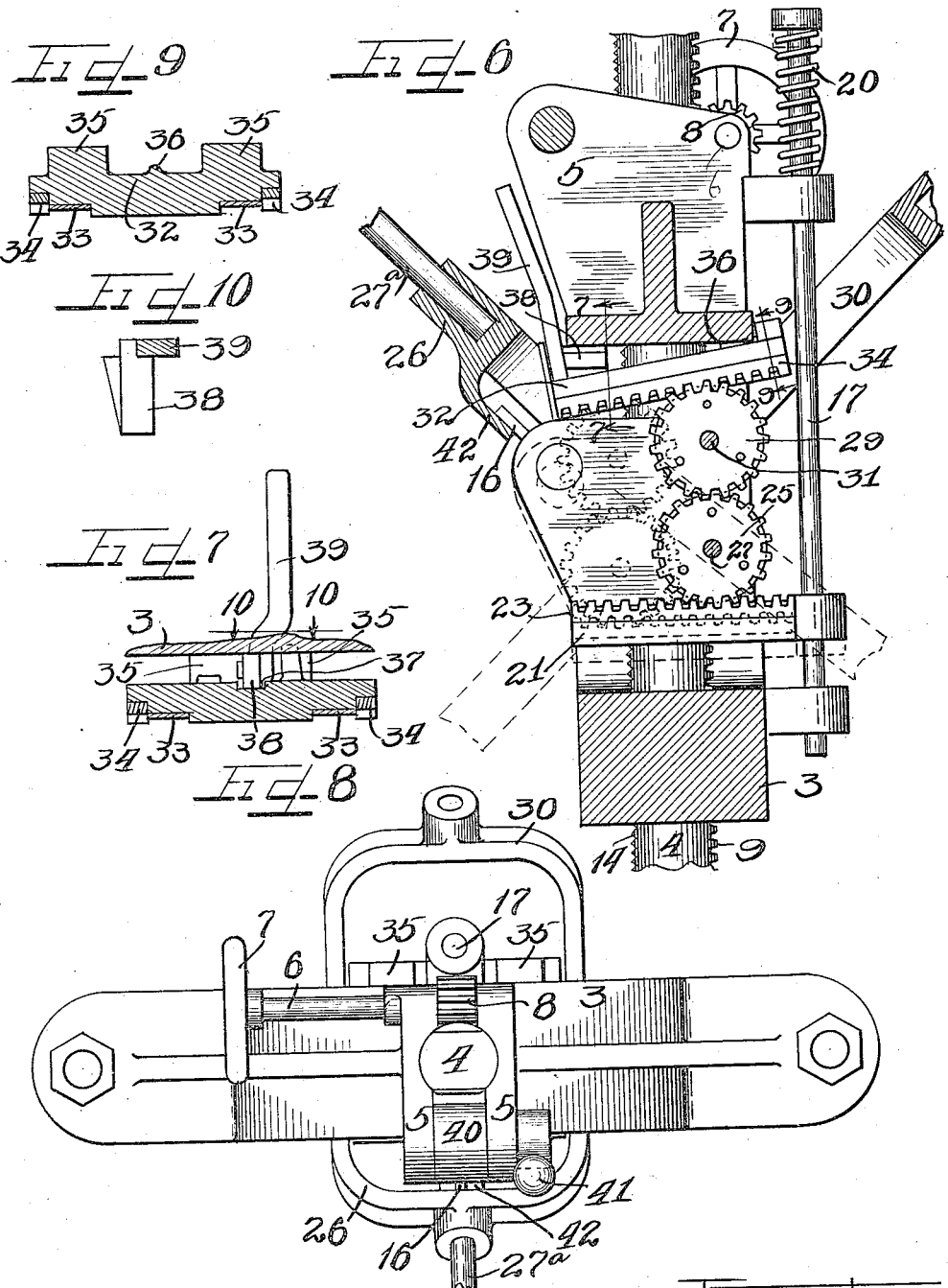

WALTER J. O. JOHNSON, OF CHICAGO, ILLINOIS, ASSIGNOR TO HARRY S. FOLGER, OF CHICAGO, ILLINOIS.

MULTIPLYING-GEAR FOR ARBOR-PRESSES.

1,232,558.

Specification of Letters Patent.

Patented July 10, 1917.

Application filed December 4, 1915. Serial No. 64,989.

*To all whom it may concern:*

Be it known that I, WALTER J. O. JOHNSON, a citizen of the United States, and a resident of the city of Chicago, in the county of Cook and State of Illinois, have invented certain new and useful Improvements in Multiplying-Gear for Arbor-Presses; and I do hereby declare that the following is a full, clear, and exact description of the same, reference being had to the accompanying drawings, and the numerals of reference marked thereon, which form a part of this specification.

This invention relates to an improved type of multiplying gear particularly adapted for use on arbor presses and the like, although of course, well adapted for any other use desired, and embracing means whereby a very large leverage effect may be gained for operating a ram, particularly without undue friction of the parts.

It is an object therefore of this invention to construct a multiplying gear utilizing a wedge action to impel a ram against an object placed in the machine, and with means adjustable to change the angle, whereby the wedge effect is gained, to change the multiplying power of the gear.

It is also an object of this invention to construct a multiplying gear with the parts adjustable to secure different multiplying factors and with the pressure obtained through the interaction of roller elements rolling one upon another and with means associated therewith and relieved of stress for operating the same.

It is also an object of this invention to construct a multiplying gear adaptable to rams, jacks, presses, etc., involving the use of rolling members having a constant or fixed distance between centers and movable between inclined bearing surfaces, the angle of inclination of which may be varied according to the pressure required to utilize the effect of separation of said elements in obtaining pressure for the purpose required.

It is also an object of this invention to construct a mechanism wherein a floating track plate is capable of adjustment at different angles to impart pressure to another movable track plate due to the interaction between said plates of rolling members, so that the separating effect and pressure obtained thereby between said plates may be transferred and utilized in operating a ram or other mechanism for the purpose.

It is furthermore an important object of this invention to provide a power multiplying mechanism having a changeable power factor obtained by merely shifting a small lever for the purpose designed for operation in conjunction with means for shifting a mandrel or ram into different relations with the power mechanism.

It is finally an object of this invention to construct an improved type of power gear simple in construction and operation and provided with means for changing the power factor, whereby different pressures upon a ram or mandrel may be obtained by shifting a single lever provided for the purpose.

The invention (in a preferred form) is illustrated in the drawings, and hereinafter more fully described.

In the drawings:

Figure 1, is a front elevation of an arbor or mandrel press equipped with a multiplying gear embodying the principles of my invention.

Fig. 2 is a detail section taken on line 2—2 of Fig. 1, illustrating the power gear in side elevation.

Fig. 3 is an enlarged central section taken on line 3—3 of Fig. 1, with parts in elevation.

Fig. 4 is a detail section taken on line 4—4 of Fig. 3, with parts in elevation and illustrating the supporting frame for the power mechanism.

Fig. 5 is a fragmentary detail section taken on line 5—5 of Fig. 4.

Fig. 6 is an enlarged side view partly in elevation and partly in section illustrating the interior operating mechanisms of the device.

Fig. 7 is a fragmentary detail section taken on line 7—7 of Fig. 6.

Fig. 8 is a top plan view of the power mechanisms on the frame, such as shown in Fig. 1.

Fig. 9 is a fragmentary detail section taken on line 9—9 of Fig. 6.

Fig. 10 is a detail section taken on line 10—10 of Fig. 7.

As shown in the drawings:

The reference numeral 1, indicates the bed of a mandrel press or frame having uprights 2, secured thereon in any suitable manner and supporting at their upper ends a frame 3, in which the actuating mechanisms for a movable ram or mandrel 4, vertically movable through said frame 3, are provided. Journaled in a yoke shaped extension 5, on said frame 3, is a shaft 6, having secured on its outer end a hand wheel 7, and on its inner end a small pinion 8, adapted to mesh with the teeth of a rack 9, formed on said ram 4. Movably mounted within the opening in the frame 3, is a carriage consisting of two similar plates 10, one on each side of the ram 4, said plates integrally connected one to another along the lower front edge by a cross member 11, and along the lower rear edge by a cross member 12.

Pivotally mounted upon said carriage between the plates 10, thereof, is a relatively large heavy pawl 13, provided with a series of teeth adapted to interlock with a series of teeth 14, formed on the front side of said ram 4, opposite to the rack 9, thereon. A small leaf spring 15, is mounted upon said cross member 11, of the carriage, and bears upwardly against the pawl 13, to normally impel the same into interlocking engagement with the teeth 14, on the ram, and a small finger piece 16, is provided on said pawl for the purpose of retracting the same from the ram when it is desired to elevate or lower the same by means of the hand wheel 7.

Extending through and rigidly secured in the rear cross member 12, of the carriage, is an upright guide rod 17, the lower end of which extends through an aperture in a ledge extension 18, on the lower rear side of the frame 3, and the upper end of which extends through another aperture in a ledge extension 19, at the upper rear edge of the frame 3. Coiled around said guide rod 17, is a compression spring 20, which bears upon the upper surface of the ledge at the upper end of the frame 3, and also beneath a head formed on the upper end of the rod 17, thus normally impelling said rod upwardly or in other words tending to resist downward movement of the carriage 10—12, and acting to return the same upwardly to normal position when the same has been depressed by mechanisms hereinafter described.

Formed on each side of the carriage 10—12, is a substantially horizontal ledge 21, which, adjacent the plate portions 10, is provided with a wear plate 22, and beyond the wear plate has a rack 23, secured rigidly in a recessed portion thereof.

Mounted on each side of the carriage 10—12, and adapted to roll upon the wear or bearing plates 22, are rollers 24, each having attached thereto a gear or pinion 25, which meshes with the rack 23, and said respective associated rollers and pinions have rigidly secured thereto a yoke 26, by means of bolts or rivets 27. Said yoke extends around the front side of the carriage 10—12, and insures an exactly similar movement of said respective rollers and pinions 24, and 25, on each side of the carriage when the yoke is swung downwardly from an upward position, such as shown in Figs. 2 and 6, to a dotted line position such as shown in Fig. 6.

A relatively long rod or lever 27ª, is secured in the yoke 26, for the purpose of moving the same and obtaining a leverage thereon. Disposed above and adapted to contact and roll upon each of the respective rollers 24, are rollers 28, and secured thereto are gears or pinions 29, meshing with the pinions 25, and said respective rollers and pinions 28 and 29, on each side of the carriage are connected for simultaneous movement and operation by a yoke 30, the ends of which are connected to said respective rollers and pinions by rivets or bolts 31, extending therethrough.

Mounted directly above the carriage 10—12, is a movable or floating angle or track plate 32, having an elongated slot therethrough through which the ram 4, extends. Said plate, as clearly shown in Fig. 5, is provided on its under surface with wear plates 33, against which the rollers 28, bear, and also with racks 34, with which the pinions 29, mesh. Said plate 32, at its rear edge is provided with a pair of upstanding lugs 35, which engage behind the upper portion of the frame 3, to limit the forward movement of the plate. In order to maintain said plate 32, properly centralized a longitudinal lip 36, is formed on the upper surface thereof at the rear end thereof and engages in a slot provided therefor in the under surface of the upper part of the frame 3. The forward end of said plate 32, has a slight recess 37, formed therein, as shown in Fig. 7, and a two sided wedge shaped block 38, having a relatively long handle 39, connected therewith, is mounted in position between the forward end of the floating angle plate 32, and the upper portion of the frame 3, so that said plate 32, is constrained to assume a tilted or angled position, the acuteness of the angle depending upon the position of the block 38, inasmuch as the respective wedge shaped portions thereof are of different depth or thickness.

A safety or retaining pawl 40, is pivoted between the extensions 5, of the frame 3, and is provided with a series of teeth to engage with the teeth 14, of the ram, to prevent retractive movement thereof during the successive downward movements by the multiplying gear, and a weighted handle 41, is associated with said pawl adapted to be thrown rearwardly of the machine into a position beyond center and when in such position acting to hold said pawl retracted out of engagement with the ram, so that adjusting movements by the hand wheel 7, may be effected.

Means are also provided for retracting the pawl 13, out of engagement with the teeth 14, of the ram when the actuating lever 27, and yoke 26, are to swing into upward position, and for this purpose an extension 42, is provided on the yoke 26, as clearly shown in Fig. 6, which projects inwardly an amount sufficient to engage the finger piece 16, of said pawl and thus retract said pawl 13.

A counter-weighted lever 43, is formed or attached on said yoke 26, as shown in Fig. 2, and acts normally to return the yoke 26 and lever 27ª, into upright position after an actuation downwardly thereof.

The operation is as follows:

The parts in normal position prior to a downward actuation of the ram for the purpose of utilizing the pressure effect thereof, is shown in Figs. 2, 3 and 6, that is, with the actuating yoke 26, and handle 27ª, in an upward position and the respective intermeshing pinions 25 and 29, and the rollers 24 and 28, associated therewith at the rear end of the racks on the respective plates 32 and 10—12. With the parts in such position, of course, the pawl 13, is held retracted, due to the extension 42, on the yoke 26, thrusting the finger piece 16, of said pawl inwardly, and likewise the pawl 40, may also be moved into retracted position by throwing the counter-weighted lever 41, thereof, inwardly beyond center, so that the ram 4, may be moved to any desired adjusted position by actuating the hand wheel 7.

The pressure movement is imparted to the ram 4, due to movement of the rollers 24 and 28, toward the forward end of the plates 10—12, and 32, the angled plate 32, necessitating a separation of said plates as the rollers move along between the same, of course, with a consequent movement of the plates 10—10. The rolling movement of the rollers 24 and 28, between said plates, is effected by the pinions 25 and 29, co-acting with the racks 23 and 34, respectively on said plates, although the racks and pinions themselves are relieved of any pressure other than that necessitated to rotate the pinions.

If it is desired to increase the multiplying power of the gear or mechanism by which the ram is actuated, this may be readily accomplished by swinging the lever 39, downwardly into a horizontal position from that shown in Figs. 1, 2 and 6, thereby rotating the wedge block 38, so that a wedge of less thickness is interposed between the plate 32, and the upper portion of the frame 3, and this effects an inclination of the floating plate 32, the inclination of which, as already pointed out, determines the power factor of the mechanism. It is evident from the description of the construction and operation that very little effort is required to overcome friction of the parts, for the reason that the same are so designed and associated that a high mechanical efficiency is obtained.

I am aware that various details of construction may be varied through a wide range without departing from the scope of the appended claims, and I therefore do not purpose limiting the patent granted otherwise than necessitated by the claims.

I claim as my invention:

1. A multiplying gear of the class described comprising a carriage, a ram, means pivotally mounted on the carriage to lock the same to said ram, and a wedge-acting roller mechanism to move said carriage and impart movement to the ram.

2. In a device of the class described, a movable ram, a movable carriage, means releasably pivoted on said carriage for connecting the carriage to the ram, and adjustable roller actuated wedge mechanism for imparting movement to said carriage to move the ram thereby.

3. In a device of the class described, a movable ram, a movable carriage associated therewith, means releasably connecting the carriage to the ram to impart movement to the ram by the carriage, a track plate, and co-acting rollers disposed between said plate and carriage and acting when moved to impel said carriage away from said plate and impart movement to the ram.

4. In a device of the class described, a movable ram, a movable carriage, releasable means mounted on the carriage and adapted to engage said ram and impart movement to the ram by the carriage, a plate adjustable at different angles with respect to said carriage, rollers interposed between said plate and carriage to impart movement to the carriage when said rollers move between said plate, pinions associated with said rollers to rotate the same, and toothed racks on said plate and carriage for co-action with said pinions to separate said plate and carriage and impart pressure movement to said ram.

5. In a device of the class described, a movable ram, a carriage movable and adapted to move said ram, a plate adjustable to vary the degree of angularity thereof with respect to said carriage, disposed adjacent said carriage, and rollers movable between said plate and carriage to impel said carriage and said ram therewith.

6. In a device of the class described, a movable power element, a carriage associated therewith and movable with respect thereto, means connecting said carriage with said element to move said element by said carriage, a plate above and disposed at an angle with respect to said carriage, co-acting rollers interposed between said carriage and plate whereby when rolled therebetween said carriage is impelled away from said plate and said power element therewith, and gears for operating said rollers.

7. In a device of the class described, a ram, a movable carriage associated therewith, a pawl mounted on said carriage and adapted to engage said ram to cause movement of the ram with said carriage, a plate adjustable above said carriage to different degrees of angularity with respect to said carriage, rollers interposed between said plate and carriage acting when rolled in one direction to cause separation of said carriage from said plate and movement of said ram by said carriage, gears for operating said rollers, racks on said plate and carriage co-acting with said gears, means for operating said gears and rollers to cause separation of said carriage and plate, and a device on said means adapted to swing said pawl out of engagement with said ram when the parts are in normal position.

8. In a device of the class described, a power mechanism comprising a carriage, a track plate adjustable thereabove, rollers adapted to track on said carriage and said plate to cause separation thereof one from another according to the angular degree of adjustment of said plate, racks provided on said plate and carriage, gears associated with said rollers meshing with one another and with said racks, and means for operating said gears to move said rollers and cause separation of said carriage from said plate.

9. In a power mechanism of the class described, a pair of elements movable away from one another, rollers interposed therebetween and tracking thereupon adapted when moved in one direction to impel one of said elements from the other, a ram associated with said elements, gears associated with said rollers for actuating the same, and means for actuating said gears to cause pressure movement of said ram.

10. In a device of the class described, a movable carriage, a plate adjustable at different angles with respect to said carriage, a wedge member for holding said plate in different angular positions of adjustment, rollers interposed between said plate and carriage element and tracking thereon, and geared means between said rollers, said plate and said carriage to operate said rollers in a direction to cause movement of the carriage from said plate.

11. In a device of the class described, a carriage, a plate adjustably mounted thereabove, a ram movably projecting through said carriage and plate, and mechanisms connected with said carriage and plate to separate the same to actuate said ram.

12. In a device of the class described, a pair of elements, a ram projecting therethrough, and roller actuated means between said elements to separate the same to actuate said ram.

In testimony whereof I have hereunto subscribed my name in the presence of two subscribing witnesses.

WALTER J. O. JOHNSON.

Witnesses:
 CHARLES W. HILLS, Jr.,
 EARL M. HARDINE.